D. L. HERRMANN AND A. A. JOHNSON.
COOK BOOK AND THE LIKE.
APPLICATION FILED JUNE 19, 1920.

1,354,395. Patented Sept. 28, 1920.
3 SHEETS—SHEET 1.

Witness
Robert F. Beck

Inventors
Dora L. Herrmann
And Arthur A. Johnson
By
Arthur A. Johnson
Attorney

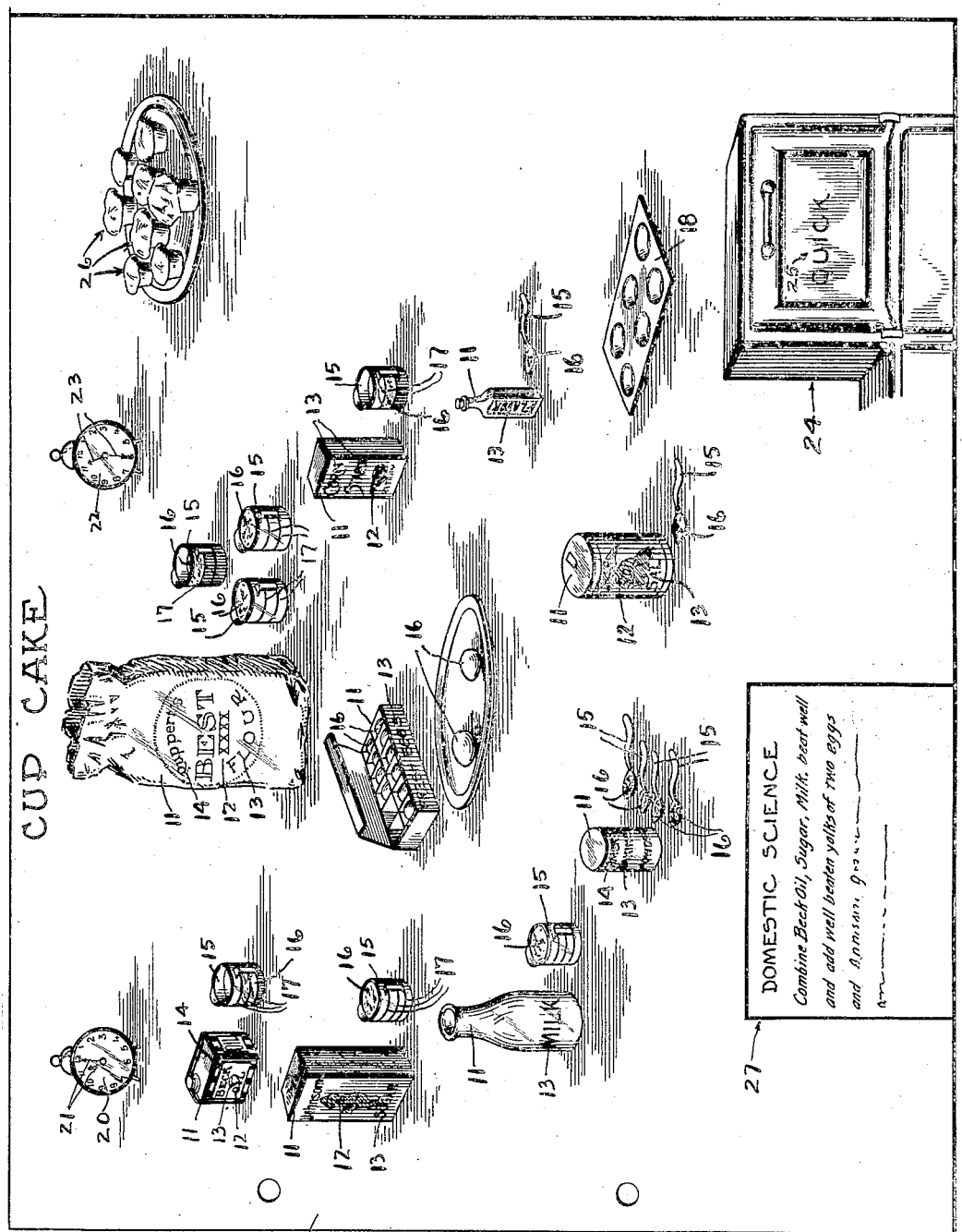

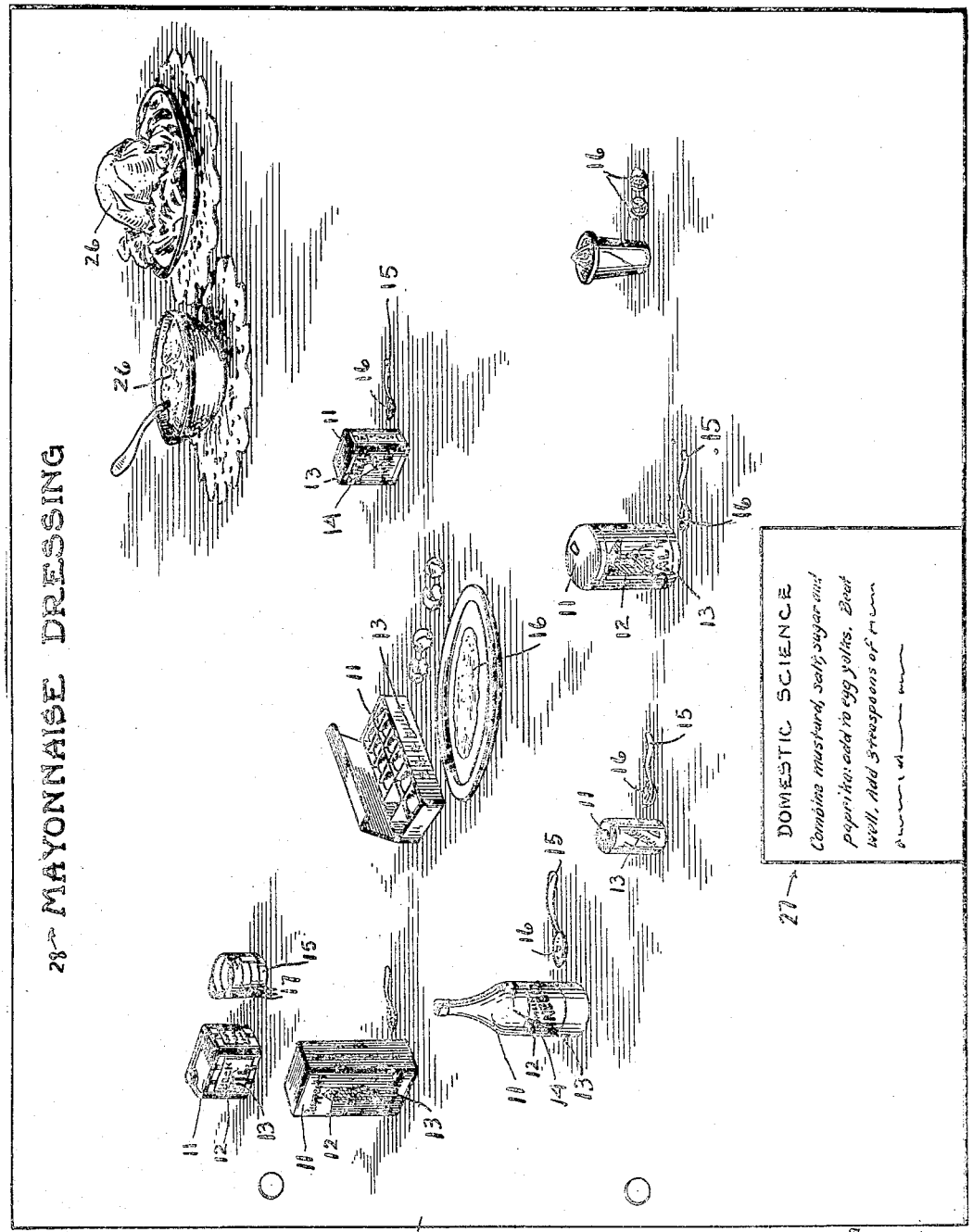

UNITED STATES PATENT OFFICE.

DORA L. HERRMANN AND ARTHUR A. JOHNSON, OF WASHINGTON, DISTRICT OF COLUMBIA.

COOK-BOOK AND THE LIKE.

1,354,395.     Specification of Letters Patent.     Patented Sept. 28, 1920.

Application filed June 19, 1920. Serial No. 390,233.

*To all whom it may concern:*

Be it known that we, DORA L. HERRMANN and ARTHUR A. JOHNSON, both citizens of the United States, residing at Washington, District of Columbia, have invented certain new and useful Improvements in Cook-Books and the like, of which the following is a specification.

This invention relates to cook books and the like and more particularly to the manner of setting forth the recipe.

Heretofore it has been the custom to arrange a list of words to indicate the ingredients of a particular article or product and to associate with each ingredient name, numerals and words to indicate the quantity of such ingredients. In using the cook book, the cook would frequently refer to the catalogue of ingredients since the mere words and numbers cannot easily be retained by the average mind. In other instances a cook book of this kind is useless, particularly to those having poor vision or illiterate persons who can not read or understand the words.

It is one of the objects of this invention to provide a cook book which is particularly useful to persons above referred to, so that without difficulty, these persons may ascertain the ingredients and the quantities thereof that enter into the product.

It is also the object of this invention to provide, for ordinary and average persons, a cook book which need not be referred to so often in the course of the work, and which if it is necessary to refer to from time to time is so arranged that at a glance they can ascertain the information sought.

In accordance with these and other objects hereinafter referred to, the present invention may be said to reside in the provision of a cook book and the like wherein the recipes are pictorially set forth. This is to say, the ingredients and the quantities thereof are indicated by pictures which most illiterate persons can understand and persons with poor vision can see; and which are readily grasped by the minds of those who are not in the above classes. It is well known that pictures are more easily retained by the mind than are mere words: therefore when the person using the book looks at the recipe as set forth by the present invention, that is pictorially, the entire recipe is stamped on their mind without effort on their part. Further, as stated, by merely glancing at the pictorially indicated recipe of the present invention the cook can ascertain at a glance the required ingredients, and, therefore, can ascertain whether such ingredients are on hand, and, if not, the needed articles will be more easily remembered in purchasing the day's supply of groceries, etc.

In its more specific aspect this invention may be said to comprise a page for a cook book having on the face thereof pictures to illustrate the containers for the ingredients and associated with each container illustrations to show by familiar measures the quantity of the associated ingredient.

A further feature of this invention is the provision, on the page of the cook book, of a picture of the finished article to show at a glance the article which results from the recipe illustrated. This picture of the finished product is preferably near the edge of the page where it can be seen by "running through" the book.

A further feature is the provision of an illustration of an oven or stove associated with each recipe which requires cooking, and indications to show the thermal condition of the oven or stove for the proper cooking of the article.

In order to indicate the time required for the cooking of the article there is provided illustrations of two clock faces, one showing an arbitrary time and the other showing a future time to indicate by the advancement of the time, the time required for cooking the article.

For those who are novices at cooking, there is associated with each recipe a domestic science lesson covering the process of mixing the ingredients, etc.

An important feature of this invention is the arrangement of the illustrations of the ingredients for the separate recipes so that the ingredient common to a number of recipes will be shown in the same general place on each page. This arrangement has the advantage that the person using the book can easily locate the ingredients and the quantities thereof after being attracted by the illustration of the finished product.

Preferably, the cook book is of the loose-leaf type so that new recipes may be added from time to time.

In order that the invention may be more fully understood reference is had to the accompanying drawings in which:

Fig. 2 is a similar view, but showing another page of our cook book, the recipe being that of cup cakes or muffins.

Fig. 3 is a similar view, but showing another page of our cook book, this recipe being that of a salad dressing.

Figure 1:
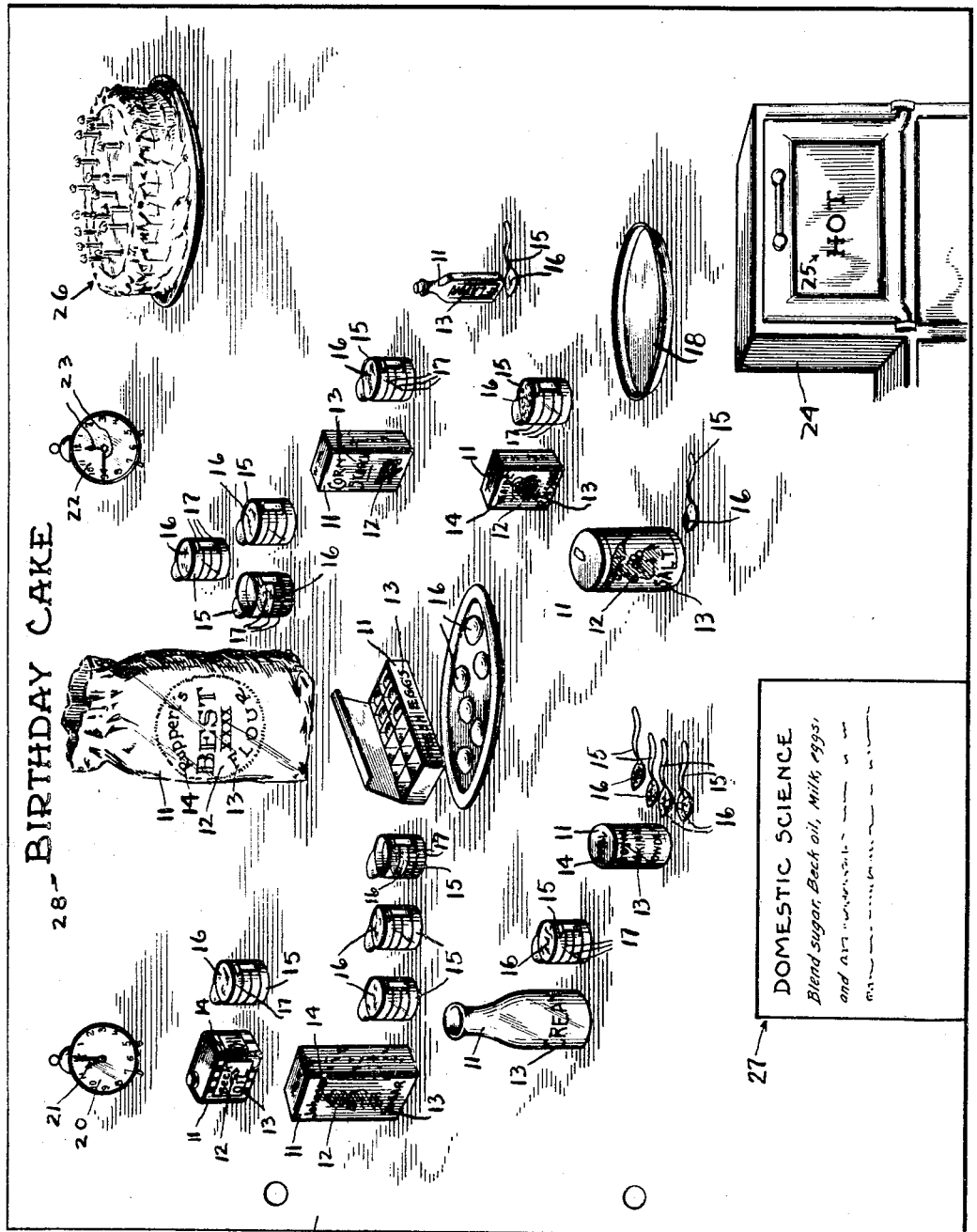
Figure 1 is a view of one page of our cook book, the recipe being that of a layer cake.

As shown in the drawing, our cook book comprises pages 10 printed or produced on either or both faces, in colors or in black and white, by printing, lithography or other suitable means, so as to show by illustration, that is to say by pictures, the ingredients which are to be used in mixing or preparing the product. The preferred form of illustration of the ingredients is that shown in the drawings, wherein the usual and commercial containers 11 of the ingredients are reproduced so as to show thereon the usual indicated trade mark or other easily recognizable characteristics 12, along with or without the name of the ingredient, as at 13 and the name of the manufacturer or distributer, as at 14. With the ingredients of the products so set forth even illiterate persons not familiar with the language will have little difficulty in determining the various ingredients. For those who can read the language but whose sight is poor, the recipe so set forth has decided advantages. For instance, by merely glancing at the recipe page these individuals can determine practically instantaneously the various ingredients, instead of reading the names arranged in columns or otherwise among a mass of words describing how the cake or other product is to be mixed, etc. Another advantage is that the pictures of the necessary ingredients will be impressed upon their minds, and consequently they will remember the ingredients for a longer time. Other advantages have been heretofore stated.

The quantities of the respective ingredients are likewise set forth. That is to say, associated with the ingredients and adjacent the containers 11 therefor, there is provided illustrations 15 of measures. In these illustrations 15 of the measures there are provided indications 16 to show by actual illustration of the ingredients in the measures the quantities of ingredients with respect to the measures. For instance, in the embodiment of our invention shown in Fig. 1, illustration 15 of the measure associated with the illustration 11 of the container for the oil, indications 16 show that the measure, a cup in this instance, is filled. The indication 16 is, in actual practice, as an imitation of the ingredient contained therein. Therefore, the illustrations 15 of the measures and the indications 16 of the actual ingredients coöperate with the illustrations 11 of the containers for the ingredients in setting forth the ingredients, as well as acting alone to indicate the quantities of such ingredients to be used.

The measures 15 may be any desired or suitable kinds, preferably, however, except in the case of spoon measures, we prefer to show the measure as being transparent so that the fractional measurements can be accurately determined; and for this purpose also the measure is provided with division marks 17.

There are some ingredients, of course, which are not usually measured except in numbers, as, for instance, eggs. In such cases and as is shown in Figs. 1 and 2 the eggs in the shell are illustrated as lying on a plate or otherwise suitably grouped to indicate that the quantity grouped enter into the product.

When the quantities are so illustrated or pictorially set forth, the person using the book can readily ascertain the correct quantities to be used. Frequently there is doubt in the mind of the person using the ordinary cook book as to whether a "cupful" means heaping-full or level-full, but this will not occur when the present book is used, since the picture shows the measure exactly. If a heaping cupful is intended it will be so shown, whereas if a level cupful is intended a level cupful will be shown. The same is true of a spoonful and all other measures. Further, any doubt as to the size of the measure intended will be easily determined by comparison with the illustrations of the containers, since the illustrations of the containers and the measures will be in proportion. This is not, however, essential, but is preferable.

To show the kind of pan or utensil which should preferably be used in cooking the article, we provide an illustration 18 on the recipe page. Of course, if desired, other utensils may be used, but the kind of utensils we illustrate in connection with each recipe is that used and inclosed by the best cooks. An important part of the cooking process is the thermal condition of the oven or other cooking appliance and the time the article is allowed to cook. This information is usually given in recipes, but it is printed in words and numbers and is sometimes difficult to find; usually the entire recipe must be read before it is ascertained how long it will take to bake a cake. The time required is an important factor in many instances especially when the cook has a limited time to prepare for the meal.

To obviate this difficulty, we provide on the recipe page an illustration of a clock, that is we show a clock-face 20, the usual hands 21, the hands indicating an arbitrary or desired time, as for instance 11 o'clock. This clock is provided at the left-hand side of the page. At the right-hand side of the page we show another clock-face 22 and hands 23. The hands 23 of the clock-face 22 indicate some future time with respect to the clock-face 20 and hands 21 and in accordance with the time required to properly cook the product. That is to say, if the clock at the left of the page indicates 11 o'clock and the clock at the right of the page indicates 11:45 as is the case in Fig. 1, they jointly indicate the time (45 minutes) which is required to cook the product. Obviously, this specific manner of indicating pictorially the time required, may be varied in different ways, as for example, by providing two distinctive sets of hands on a single clock-face or by providing the clock-face for the time when the product should be finished and providing a rule that the starting time is uniformly an arbitrary time, say, for instance, 11 o'clock. These variations are within the scope of our invention and therefore, we expressly reserve the right to indicate the time required pictorially by any specific embodiment thereof which is within the scope of our claims.

For indicating the thermal condition of the oven when such is used, we provide an illustration 24 of an oven or cooking appliance and on or adjacent the illustration of the oven we provide an indication 25 to show the proper thermal condition of the oven. This indication 25 may be, as shown, merely the word, "hot," "moderate," "slow" or any other word familiar and clearly understood by those who cook, or it may be an illustration of a pyrometer and showing by the indicator thereof the proper thermal condition of the oven, or it may be both, or in fact any suitable indication. Therefore, we would not have our invention understood to be limited by the specific embodiment illustrated.

To permit the cook to quickly and easily determine what the recipe relates to or to find a recipe for a particular type of product desired, we provide on the recipe page a picture 26 of the finished product. This picture is preferably at the outside margin of the book if the leaves are bound or held together by a loose leaf binder; if not, it is preferably at that part of the page or sheet which is most easily accessible to the user. This illustration 26 of the cooked product has numerous advantages some of which have been above enumerated and others of which are obvious.

For those for whom it is necessary or who require it we provide on the recipe page a printed domestic science lesson or lecture 27 to describe the method of mixing the ingredients, etc. For the average person, skilled in the art, this domestic science lecture is not necessary, however, since it is common knowledge that certain ingredients are prepared separately and then mixed in a certain way preparatory to being baked or cooked. Our domestic science lecture describes the manner in which the ingredients are prepared, so that those who do not have this knowledge may learn. This study is materially facilitated by illustrating the ingredients and their quantities so that the main attention and effort can be directed to the domestic science by the student or beginner.

To further indicate the finished product we provide at the head of each recipe a title 28, which is of course any suitable word or phrase indicative of the nature of the product or any arbitrary word which may be used as a name according as it is desired. This title is preferably adjacent the finished product for obvious reasons. It may be conveniently placed between the two clock faces as illustrated in Figs. 1 and 2.

It will be noted that the various ingredients shown in both Figs. 1 and 2 are in substantially the same place on each recipe. This order is maintained where it is feasible so that the user of the book can readily determine by glancing at that part of the page where the particular ingredient sought is usually found, to determine if the ingredient is present in the recipe and if so, the quantity to be used. Of course, it is not always possible or practical to do this, for instance in the form shown in Fig. 3 there is no flour used and therefore the flour is not shown. But, the other ingredients which are also used in the recipe shown in Fig. 1 and Fig. 2 are in the same place they occupied in these recipes.

The invention as herein illustrated is in the form of a loose leaf book, but it should be understood that it can be also in the form of cards or in fact any other way desired. The separate recipe sheets may if desired be furnished separately as for instance as a supplement to a magazine or as additional sheets to be added to those furnished in groups in book form. If desired the book of recipes may be permanently bound as distinguished from loose leaf binding.

Variations may be resorted to within the scope of our invention and portions thereof may be used without others.

We claim as our invention:

1. A recipe sheet for cook-books and the like having thereon means comprising pictorial illustrations to indicate the ingredients entering into the product covered by the recipe and also having thereon means comprising pictorial illustrations, associated with said pictorial ingredient illustrations, to indicate the quantities of the ingredients to be used.

2. A recipe sheet for cook-books and the like having thereon means comprising pictorial illustrations of the containers in which the respective ingredients entering into the product covered by the recipe are usually put up for sale or distribution, and means comprising pictorial illustrations on said sheet adjacent the pictorial container illustrations to indicate the quantity of the associated ingredient to be used.

3. A recipe sheet for cook-books and the like having thereon means comprising pictorial illustrations of the containers in which the respective ingredients entering into the product covered by the recipe are usually put up for sale or distribution, and means comprising pictorial illustrations to indicate measures on said sheet adjacent each of said pictorial container illustrations to indicate the quantity of the associated ingredient to be used.

4. A recipe sheet for cook-books and the like having thereon means comprising pictorial illustrations of the containers in which the respective ingredients entering into the product covered by the recipe are usually put up for sale or distribution, and means on said sheet comprising pictorial illustrations of measures adjacent each of said pictorial container illustrations to indicate the quantity of the associated ingredient to be used, said ingredient being illustrated in said measures.

5. A recipe sheet for cook books and the like having thereon means comprising pictorial illustrations to indicate the ingredients entering into the product covered by the recipe, and also having thereon pictorial illustrations of measures associated with each pictorial ingredient illustration to indicate the quantity thereof to be used.

6. A recipe sheet for cook-books and the like having thereon illustrations to pictorially indicate the ingredients entering into the product covered by the recipe and also having thereon means to indicate the quantities thereof to be used.

7. A recipe sheet for cook-books and the like having illustrations thereon to pictorially indicate the ingredients entering into the product covered by the recipe and also having means thereon to indicate the quantities thereof to be used; and a picture on the sheet of the product covered by the recipe.

8. A recipe sheet for cook-books and the like having illustrations thereon to pictorially indicate the ingredients entering into the product covered by the recipe and also having thereon means to indicate the quantities thereof to be used; and means on said sheet for pictorially indicating the time required for cooking the product covered by the recipe.

9. A recipe sheet for cook-books and the like having thereon illustrations to pictorially indicate the ingredients entering into the product covered by the recipe and also having thereon means to indicate the quantities thereof to be used; and means comprising an illustration of a cooking appliance and indicating means associated therewith to indicate the thermal condition of the cooking appliance for cooking the product.

10. A recipe page for cook-books and the like having illustrations thereon to pictorially indicate the product covered by the recipe; illustrations thereon to pictorially indicate the ingredients entering into the product; illustrations thereon to pictorially indicate the containers in which the respective ingredients entering into the product covered by the recipe are usually put up for sale or distribution; illustrations thereon to pictorially indicate the quantities of the ingredients to be used; an illustration of a cooking appliance; indications associated with the illustration of the cooking appliance to show the proper thermal condition thereof; an illustration thereon of a clock-face to pictorially indicate an arbitrary starting time for the cooking operation; another clock-face to show a future time, the difference in time indicated by comparison of said two clock-faces indicating the time required to cook the product; and a domestic science lesson printed thereon to specify how the ingredients should be prepared before cooking and other information relating to the recipe and product covered thereby.

11. A cook-book having a plurality of pages, each as set forth in claim 6, in which the illustrations of the ingredients which are common to a number of recipes occupy substantially the same place on each recipe containing said ingredient.

In testimony whereof we affix our signatures.

DORA L. HERRMANN.
ARTHUR A. JOHNSON.